United States Patent
Vertel et al.

(10) Patent No.: US 10,160,540 B2
(45) Date of Patent: Dec. 25, 2018

(54) ROTOR HEAD FOR A VERTICAL TAKEOFF AND LANDING AIRCRAFT

(71) Applicant: Rohr, Inc., Chula Vista, CA (US)

(72) Inventors: John F. Vertel, Coronado, CA (US); Sreenivas Narayanan Nampy, Chula Vista, CA (US); Matthew J. Smelcer, Middleburg, FL (US)

(73) Assignee: Rohr, Inc., Chula Vista, CA (US)

( * ) Notice: Subject to any disclaimer, the term of this patent is extended or adjusted under 35 U.S.C. 154(b) by 551 days.

(21) Appl. No.: 14/593,714

(22) Filed: Jan. 9, 2015

(65) Prior Publication Data
US 2016/0200434 A1   Jul. 14, 2016

(51) Int. Cl.
*B64C 27/51* (2006.01)
*B64C 27/33* (2006.01)

(52) U.S. Cl.
CPC .............. *B64C 27/51* (2013.01); *B64C 27/33* (2013.01)

(58) Field of Classification Search
CPC ...................................................... B64C 27/51
See application file for complete search history.

(56) References Cited

U.S. PATENT DOCUMENTS

| 4,111,605 A | 9/1978 | Roman et al. |
| 4,344,739 A | 8/1982 | Derschmidt et al. |
| 4,349,317 A | 9/1982 | Desjardins |
| 4,403,918 A | 9/1983 | Schramm |
| 4,427,340 A * | 1/1984 | Metzger ................. B64C 27/33 416/134 A |
| 4,568,245 A | 2/1986 | Hibyan et al. |
| 4,676,720 A * | 6/1987 | Niwa ...................... B64C 27/33 416/134 A |
| 4,898,515 A * | 2/1990 | Beno ..................... B29C 70/083 416/134 A |
| 5,242,267 A | 9/1993 | Byrnes et al. |
| 7,665,969 B2 | 2/2010 | Stamps et al. |
| 7,695,249 B2 * | 4/2010 | Krauss ................... B64C 27/10 416/134 A |
| 2013/0280075 A1 | 10/2013 | Kuntze-Fechner et al. |
| 2014/0271200 A1 | 9/2014 | Sutton et al. |

FOREIGN PATENT DOCUMENTS

EP    0288957 A2   11/1988

OTHER PUBLICATIONS

EP search report for EP16150430 dated May 2, 2016.

* cited by examiner

*Primary Examiner* — Dwayne J White
*Assistant Examiner* — Jason Davis
(74) *Attorney, Agent, or Firm* — O'Shea Getz P.C.

(57) ABSTRACT

An apparatus is provided for a vertical take-off and landing aircraft. The apparatus includes a rotor head with a rotor hub and a plurality of rotor blade attachment structures. The attachment structures are disposed about and extend radially out from the rotor hub. Each of the attachment structures may be configured from or otherwise include flexible matrix composite material. In addition or alternatively, the rotor head may be a monolithic bearingless rotor head.

15 Claims, 8 Drawing Sheets

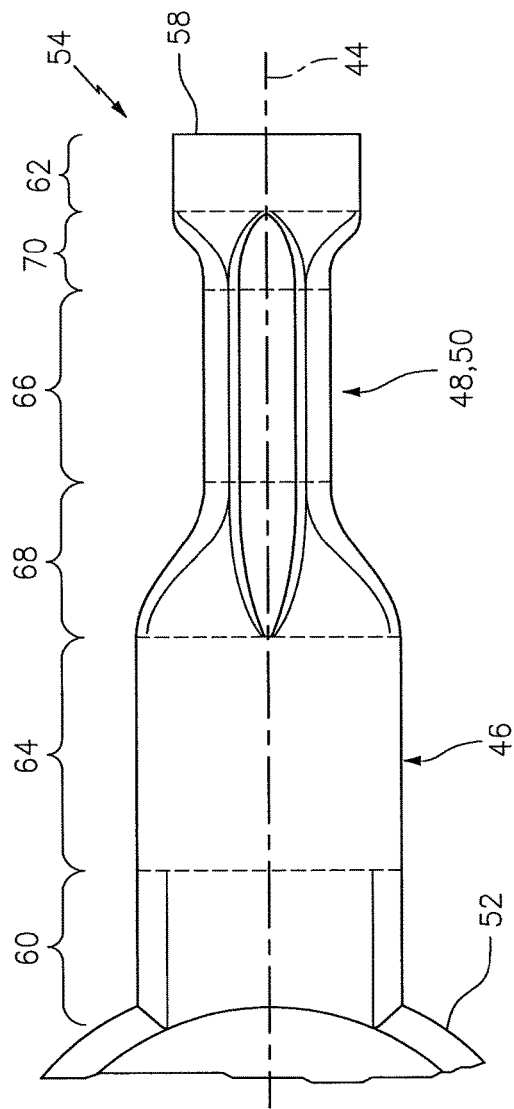
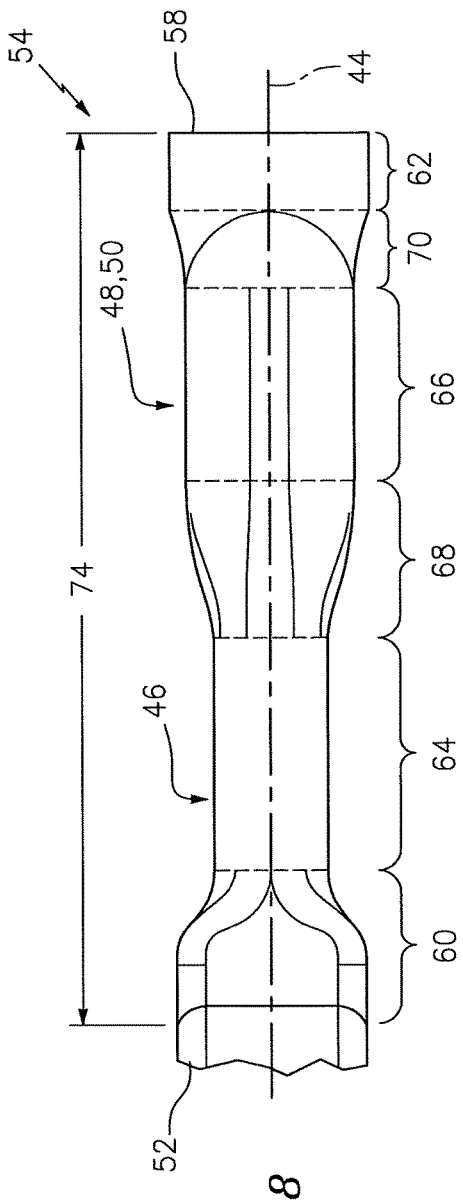
FIG. 7
FIG. 8

ROTOR HEAD FOR A VERTICAL TAKEOFF AND LANDING AIRCRAFT

BACKGROUND OF THE INVENTION

1. Technical Field

This disclosure relates generally to a vertical takeoff and landing (VTOL) aircraft and, more particularly, to a rotor head for a VTOL aircraft.

2. Background Information

A vertical takeoff and landing (VTOL) aircraft such as a helicopter typically includes a plurality of rotors such as a main rotor and a tail rotor. Each rotor includes a plurality of rotor blades arranged around and attached to a rotor hub. Particularly in the case of a main rotor, although also applicable to a tail rotor, each rotor blade may be attached to the rotor hub by a plurality of hinges and/or bearings. These hinges/bearings are configured to allow vibratory movement within and out of a plane of rotor rotation. The hinges/bearings are also configured to allow twisting of the respective rotor blade. However, such hinges/bearings can significantly increase the complexity, aerodynamic drag and cost of the rotor. The additional complexity may also increase time and costs associated with rotor maintenance and repair. Some bearingless rotor assemblies have been proposed, but these assemblies remain relatively complex, expensive, and still require at least some independent and attached active or passive dampers.

There is a need in the art for an improved rotor for a vertical takeoff and landing (VTOL) aircraft such as a helicopter.

SUMMARY OF THE DISCLOSURE

According to an aspect of the invention, an apparatus is provided for a vertical take-off and landing aircraft. This apparatus may be or include a rotor head, which includes a rotor hub and a plurality of rotor blade attachment structures. The attachment structures are disposed about and extend radially out from the rotor hub. Each of the attachment structures is configured from or otherwise include flexible matrix composite material.

According to another aspect of the invention, another apparatus is provided for a vertical take-off and landing aircraft. This apparatus may be or include a monolithic bearingless rotor head, which includes a rotor hub and a plurality of rotor blade attachment structures. The attachment structures are disposed around and extend radially out from the rotor hub.

The rotor head may be configured from or otherwise include fiber reinforced flexible matrix composite materials. The rotor head may also be configured from or otherwise include rigid matric composite materials.

One or more of the attachment structures may each be configured from or otherwise include material operable to damp flap, lead-lag and/or torsional rotor blade movement.

One or more of the attachment structures may each be configured with a virtual flapping hinge, a virtual lead-lag hinge and/or a virtual torsion hinge.

The flexible matrix composite material may be fiber reinforced.

The rotor head may be a monolithic bearingless rotor head.

At least a portion of one of the attachment structures may have a laterally elongated cross-sectional geometry.

At least a portion of one of the attachment structures may have an axially elongated cross-sectional geometry.

An outer surface of at least a portion of one of the attachment structures may have a concave region and/or an inside corner region.

At least a portion of one of the attachment structures may be hollow.

At least a portion of one of the attachment structures may include a web. This web may extend substantially a radial length of the respective one of the attachment structures.

The foregoing features and the operation of the invention will become more apparent in light of the following description and the accompanying drawings.

BRIEF DESCRIPTION OF THE DRAWINGS

FIG. 7 is a top view illustration of a rotor blade attachment structure.

FIG. 8 is a side view illustration of the attachment structure of FIG. 7.

DETAILED DESCRIPTION OF THE INVENTION

Figure 1:
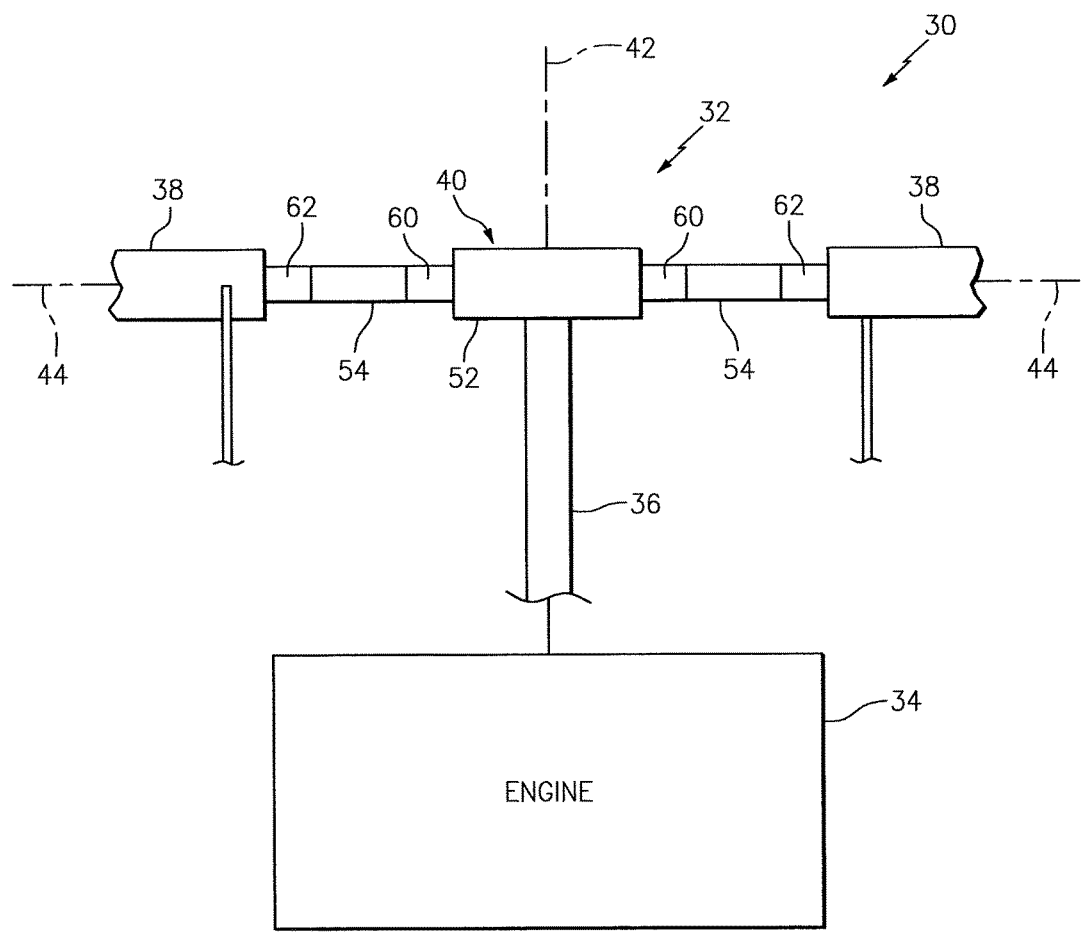
FIG. 1 is a schematic illustration of a propulsion system for a vertical take-off and landing (VTOL) aircraft.

FIG. 1 schematically illustrates a propulsion system 30 for a vertical take-off and landing (VTOL) aircraft such as a rotary-wing aircraft; e.g., a helicopter or drone. This propulsion system 30 includes at least one rotor 32, which is driven by an engine 34 through a rotatable drive shaft 36; e.g., a mast. The rotor 32 includes a plurality of rotor blades 38 and a rotor head 40, which connects the rotor blades 38 to and positions the rotor blades 38 around the drive shaft 36. Other known components and mechanisms may also be included as will be recognized by those of skill in this art.

Figure 3:
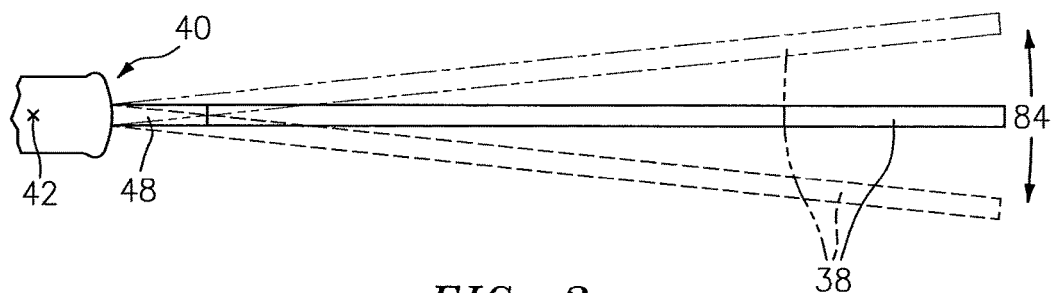
FIG. 3 is a schematic illustration of a portion of a rotor in a lead-lag motion.
Figure 4:
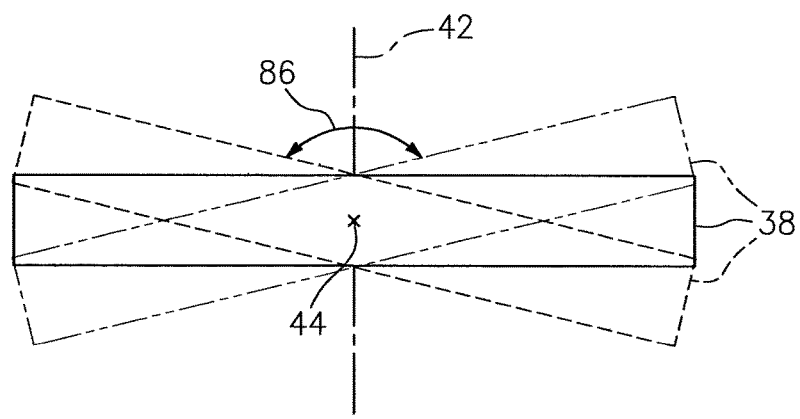
FIG. 4 is a schematic illustration of a portion of a rotor in a torsion motion.

The rotor blades 38 are configured to generate vertical and/or horizontal thrust (e.g., lift and propulsion) while moving about an axis 42 of the drive shaft 36 in a plane of rotor rotation. During this movement, each of the rotor blades 38 may be subject to various loads including flap loads, lead-lag loads and torsion loads as well as coupled/combined motions from these degrees of freedom. The flap loads correspond to (e.g., up and down) movement of a rotor blade 38 perpendicular to the plane of rotor rotation (see FIG. 2). The lead-lag loads correspond to (e.g., back and forth) movement of a rotor blade 38 within the plane of rotor rotation (see FIG. 3). The torsion loads correspond to (e.g., rotational) movement of a rotor blade 38 about a longitudinal axis 44 of that blade 38, which blade axis 44 extends radially out from and is generally normal to the shaft axis 42 in the plane of rotor rotation (see FIG. 4). Such loads, if not managed, can generate significant vibrations and strains/stresses within the rotor blades 38, the rotor 32 as well as the entire airframe structure of the VTOL aircraft.

The rotor head 40 is configured to effectively manage one or more of the aforementioned loads in a simpler, less complex manner than has been previously achieved. The rotor head 40 of FIGS. 5 and 6, for example, is a bearingless rotor head. This rotor head 40 is configured with a virtual flap hinge 46, a virtual lead-lag hinge 48 and a virtual torsion hinge 50 for each of the rotor blades 38. One or more of the virtual hinges 46, 48 and 50 may also be referred to as virtual bearings.

Figure 2:
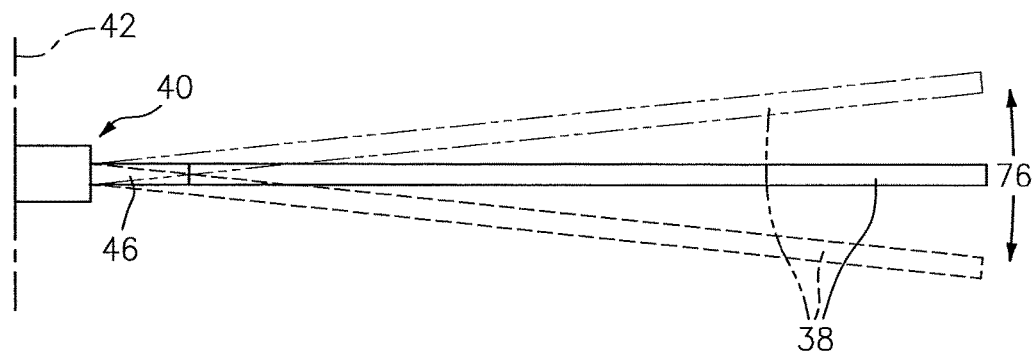
FIG. 2 is a schematic illustration of a portion of a rotor in a flap motion.

The flap hinge 46 enables rotor blade 38 movement out of the plane of rotor rotation (see FIG. 2). The lead-lag hinge 48 enables rotor blade 38 circumferential movement in the plane of rotor rotation (see FIG. 3). The torsion hinge 50 enables rotor blade 38 rotation about the axis 44 of that blade 38 (see FIG. 4).

The term "virtual hinge" or "virtual bearing" describes a structure which functionally provides bending and/or twisting movement through strain or deformation of the body's material rather than through relative movement between discrete elements such as occurs with ball bearings or hinge pins. The term "bearingless" is used herein to describe a rotor assembly or portion thereof which does not include any mechanical bearings or hinges with discrete elements that move relative to one another. Exemplary embodiments of "virtual" flap, lead-lag and torsion hinges 46, 48 and 50 are described below in further detail. The rotor head 40 of the present disclosure, of course, is not limited to the exemplary embodiments described below and illustrated in the drawings.

Figure 5:
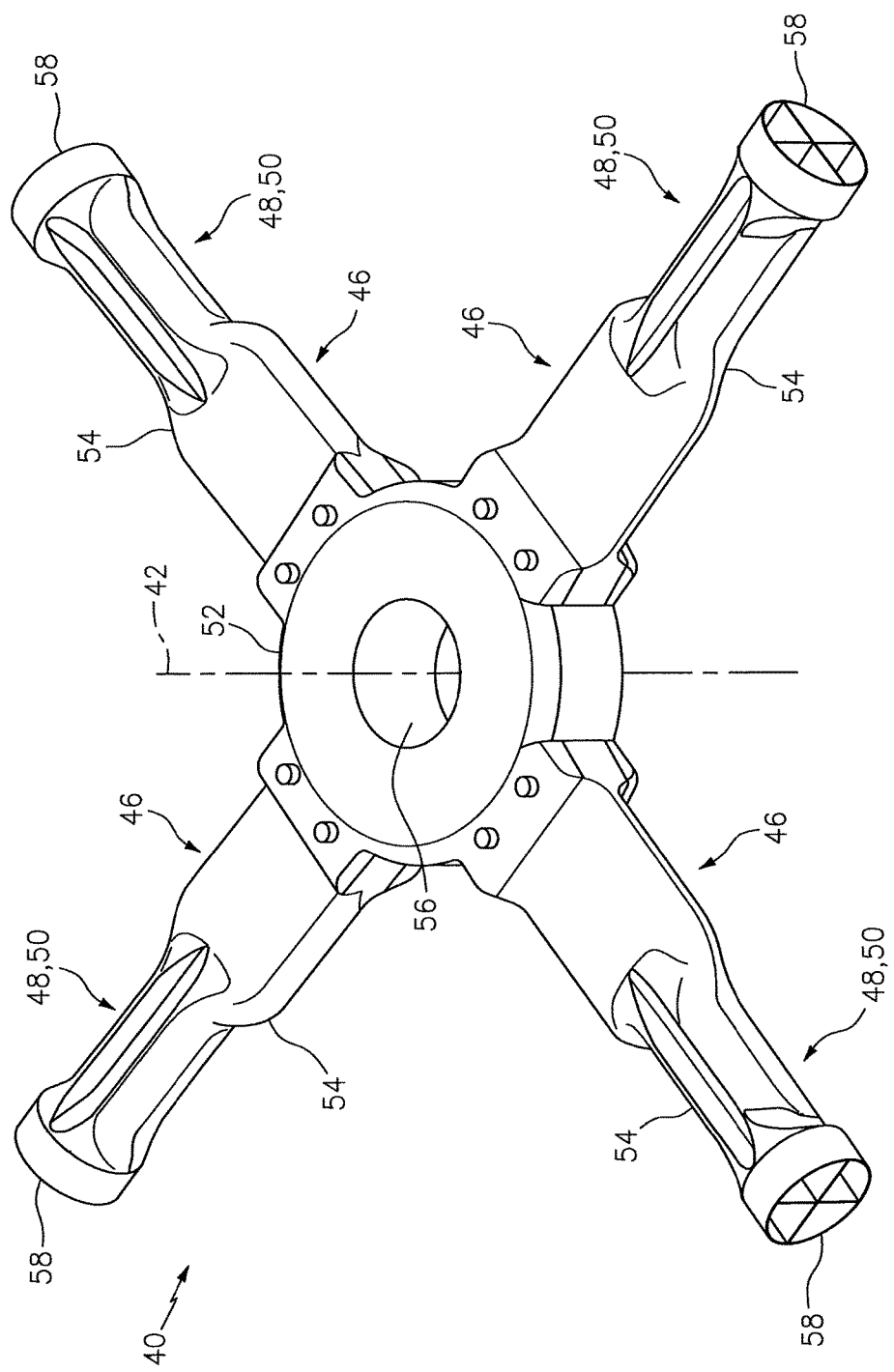
FIG. 5 is a perspective illustration of a monolithic bearingless rotor head.
Figure 6:
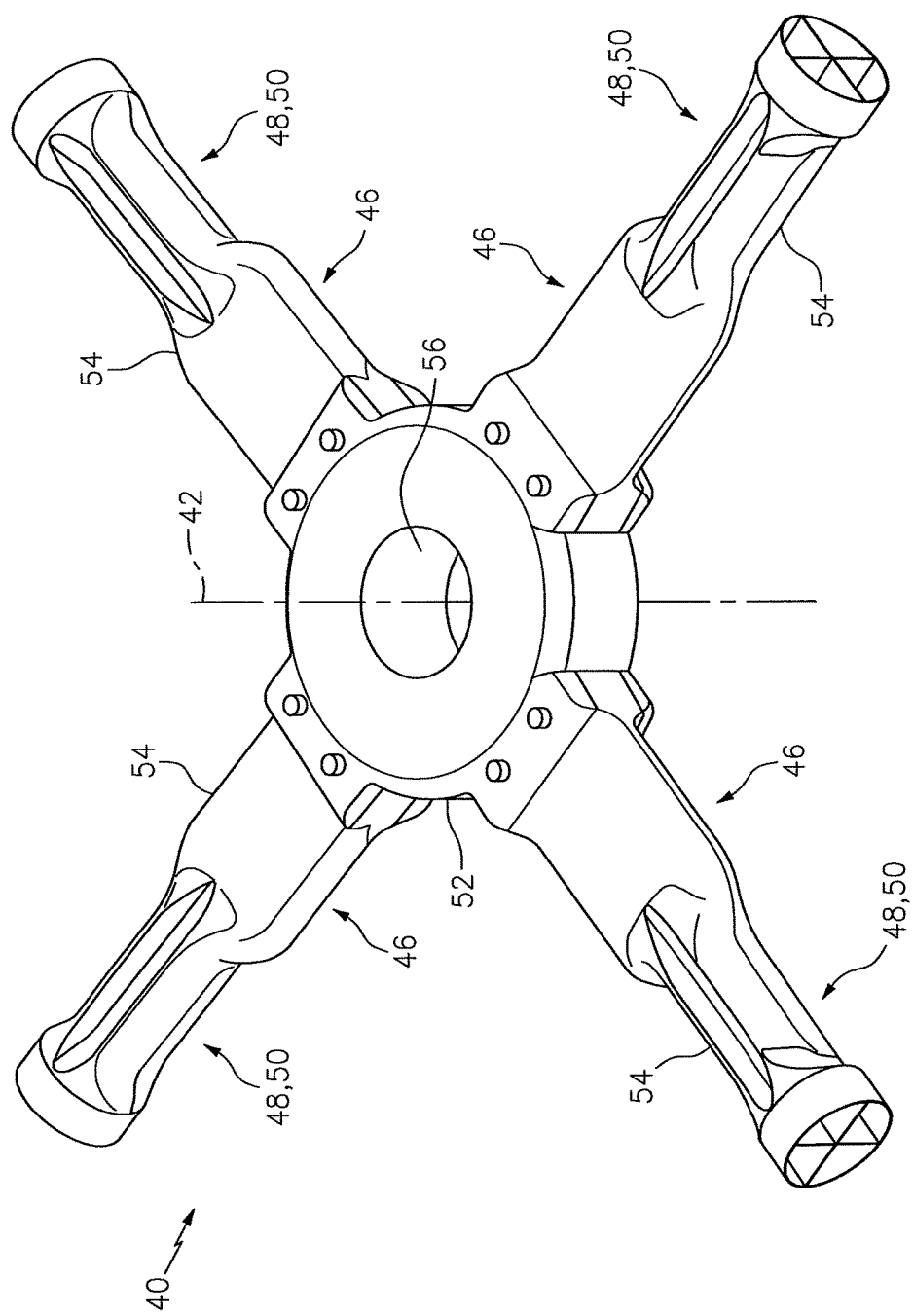
FIG. 6 is a perspective illustration of a bearingless rotor head.

The rotor head 40 may be configured from a plurality of discrete components (e.g., 52 and 54) which are mechanically fastened together as shown in FIG. 6. Alternatively, as shown in FIG. 5, the rotor head 40 may be configured as a monolithic structure, which may reduce rotor 32 complexity and/or costs.

The rotor head 40 of FIG. 5 is manufactured as a single integral unitary body; e.g., a body without any removable and/or mechanically attached components. For example, the entire rotor head 40 may be infusion molded from fiber reinforced, flexible matrix composite (FMC) material such as, but not limited to, carbon fiber in a urethane matrix. One or more metallic and/or other elements may also be integrated into the monolithic rotor head 40 by at least partially embedding these elements in the flexible matrix composite material. One or more (e.g., metallic) backbones, stiffeners, plates and/or mounting hardware, for example, may be incorporated into the monolithic rotor head 40 during the molding process. The monolithic rotor head 40 of the present disclosure, however, is not limited to the foregoing exemplary constructions and/or manufacturing processes. Furthermore, in some embodiments, the rotor head 40 may also be configured from or otherwise include rigid matrix composite materials.

The entire rotor head 40, or component(s) thereof, may be constructed from FMC material as set forth above. The term "flexible matrix composite" or "FMC" is used herein to refer to continuous fiber reinforced composites with a matrix system that has a glass transition temperature below its operating temperature. FMCs may include fiber reinforced composites with elastomeric matrix systems or low glass transition temperature thermoplastics. The preferred system utilizes the elastomeric matrix for most known applications.

Materials that have a glass transition temperature (Tg) below the operating temperature are more flexible than materials in which the Tg is above the operating temperature. When these materials are at temperatures below the Tg, their behavior is more in line with rigid matrix materials. When these materials are used as a matrix in the composite form (FMCs), the composite can experience high elongation and large strain to failure in the non-fiber dominated directions. This is because, compared to rigid matrix composites (RMCs) such as conventional thermoset resin systems with glass transition temperatures above their operating temperatures, such as carbon/epoxy, the FMCs have a very low modulus in the transverse and compressive directions while tensile properties in the direction of the fibers remain within the range of conventional fiber reinforced composite. The transverse and compressive modulus properties of the FMC materials have been shown to be 1 to more than 3 orders of magnitude lower.

FMC materials also exhibit high viscoelastic behavior as compared to conventional composites which lends themselves to much higher vibration damping capabilities. The loss factors of conventional matrix systems can range from 0.004 to 0.03 whereas the loss factors for typical polyurethane matrix systems can be close to 0.1.

The FMC material may be selected to provide the rotor head 40 with engineered flexibility to accommodate the strains resulting from the rotor head loads, and intrinsic passive damping characteristics. Depending upon the flexible matrix composite material selected, these damping characteristics may be strong enough or tailored specifically via resin chemistry to provide substantially all damping for the rotor head 40; e.g., the rotor head 40 may be configured without any discrete mechanical or hydraulic (e.g., active) dampers. Examples of such flexible matrix composite material include, but not limited to, those FMC materials with a urethane matrix such as OPTI-G (manufactured by Engineered Polymer Products of Jacksonville, Fla.). The rotor head 40 of the present disclosure, however, is not limited to the exemplary rotor head materials described above.

The entire rotor head 40, or component(s) thereof, may be configured with integral damping as set forth above. In this manner, vibrations associated with the flap, the lead-lag and/or the torsion loads may be passively damped to reduce the internal stresses. Incorporating the damping function into the rotor head 40 material may also reduce rotor head 40 complexity and/or costs. The rotor head 40, however, may also or alternatively be configured with one or more discrete dampers (not shown). Such dampers may be mechanically attached to and/or between one or more other rotor head 40 component(s), or between the rotor head 40 and respective rotor blades, as will be well understood by those of skill in this art. Examples of such a damper include, but are not limited to, an elastically deformable element such as a spring, a hydraulic device such as a shock, etc.

Referring to FIG. 1, the rotor head 40 includes a rotor hub 52 and a plurality of rotor blade attachment structures 54; e.g., beams, etc. It is worth noting, the rotor hub 52 and the attachment structures 54 may be configured part of a monolithic rotor head 40 as illustrated in FIG. 5. Alternatively, one or more of the attachment structures 54 may be configured discrete from and mechanically fastened to the rotor hub 52 as illustrated in FIG. 6. For ease of description, however, the rotor hub 52 and the attachment structures 54 are described below as being part of a single monolithic rotor head 40.

Referring to FIG. 1, the rotor hub 52 is configured to mount the rotor 32 to the drive shaft 36. The rotor hub 52 of FIG. 5, for example, is a generally annular portion (or body)

of the rotor head 40 with a central bore 56 extending therethrough (or therein) along the axis 42. This central bore 56 is configured to receive the drive shaft 36 (see FIG. 1). The rotor hub 52 may be attached to the drive shaft 36 using any suitable attachment scheme such as, but not limited to, a splined connection and/or a keyed connection.

The attachment structures 54 are (e.g., uniformly) disposed about the rotor hub 52. Referring to FIGS. 7 and 8, each of the attachment structures 54 extends radially out from the rotor hub 52 along a respective radial centerline (e.g., the axis 44) to a distal end 58. At least a portion or substantially all of one or more of the attachment structures 54 may be hollow. Alternatively, at least a portion of substantially all of one or more of the attachment structures 54 may be solid or filled with a filler material; e.g., additional damping material such as FMC material.

Each attachment structure 54 is configured with a base portion 60 and a rotor blade attachment portion 62. One or more of the attachment structures 54 may also each be configured with one or more virtual hinges or bearings portions 64 and 66 and/or one or more transition portions 68 and 70.

The base portion 60 is connected to the rotor hub 52. The base portion 60 is configured as a transition and linkage between the rotor hub 52 and the remainder of the attachment structure 54. The base portion 60 extends radially along the centerline 44 from the rotor hub 52 to the first hinge portion 64.

Referring to FIG. 1, the attachment portion 62 is configured to mount a respective one of the rotor blades 38 to the rotor head 40. Each rotor blade 38, for example, may be mechanically fastened (e.g., bolted) to the attachment portion 62 of a respective one of the attachment structures 54 at (e.g., on, adjacent or proximate) its distal end 58 (see FIG. 5).

Figure 9:
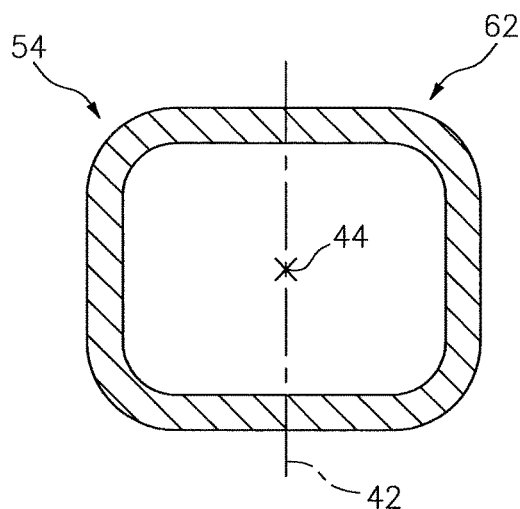
FIGS. 9-12 are cross-sectional illustrations of embodiments of a rotor blade attachment portion of a rotor blade attachment structure.
Figure 10:
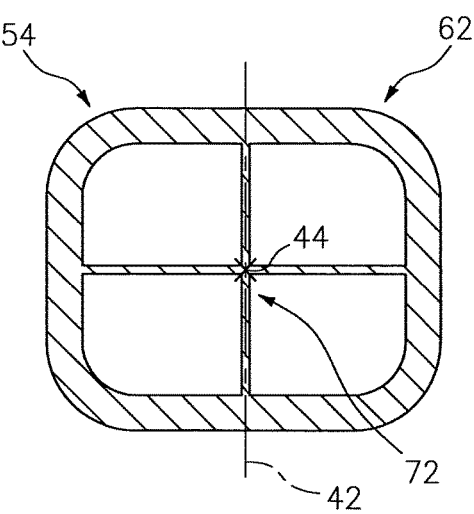
Figure 11:
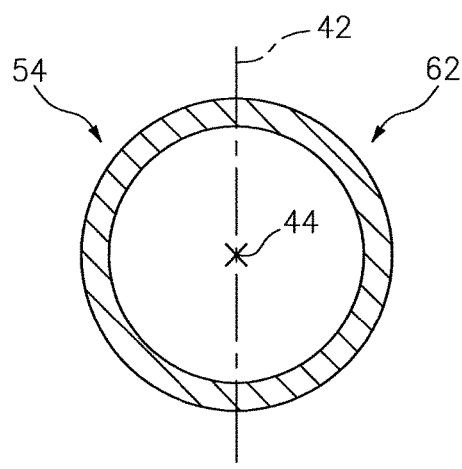
Figure 12:
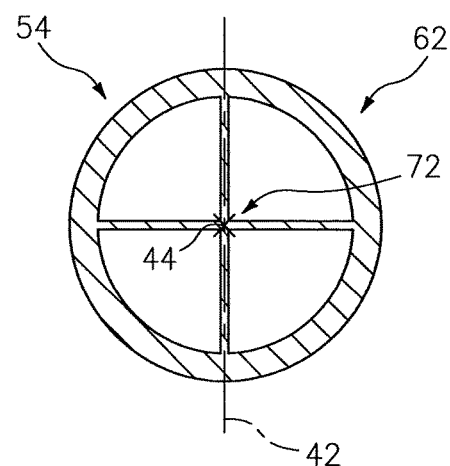

Referring to FIGS. 7 and 8, the attachment portion 62 extends along the centerline 44 from the second transition portion 70 to the distal end 58. The attachment portion 62 may have a (e.g., annular) cross-sectional geometry with a generally polygonal (e.g., square, rectangular, etc.) shape as shown in FIGS. 9 and 10. Alternatively, the cross-sectional geometry may have a curved (e.g., circular, elliptical, etc.) shape as shown in FIGS. 11 and 12. The attachment portion 62 of the present disclosure, however, is not limited to the foregoing exemplary cross-sectional shapes.

Referring to FIGS. 10 and 12, the attachment portion 62 may also include an inner web 72 that extends radially along the centerline 44 at least partially therein. This inner web 72 may provide additional strength and rigidity to the attachment portion 62 as well as a structural tie to the rotor hub 52 or backbone where, for example, the web 72 extends substantially a radial length 74 (see FIG. 8) of the attachment structure 54, through all of its various portions or sections, from the distal end 58 to the rotor hub 52. This web 72 may be capable of providing most of the tension force required to react the centrifugal loads of the rotor blades 38 during operation of the aircraft.

Referring to FIGS. 7 and 8, the first hinge portion 64 may be configured as the virtual flap hinge 46. The first hinge portion 64, for example, may be configured to resiliently bend in a manner that enables movement of the attachment portion 62 and, thus, a respective rotor blade 38 (e.g., up and down) along a trajectory 76 generally perpendicular to the plane of rotor rotation (see FIG. 2).

Figure 13:
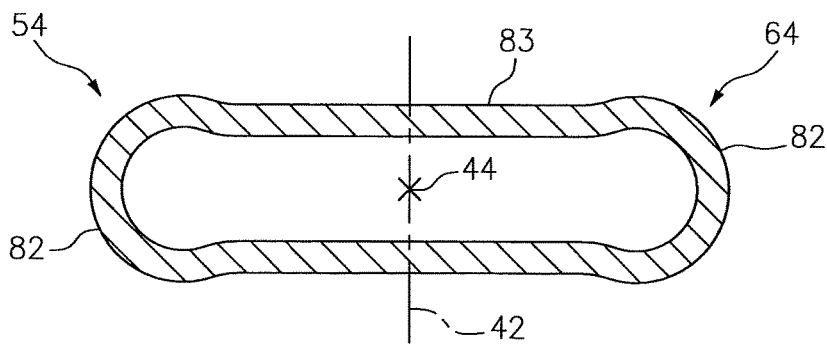
FIGS. 13-16 are cross-sectional illustrations of embodiments of a virtual flap hinge portion of a rotor blade attachment structure.
Figure 14:
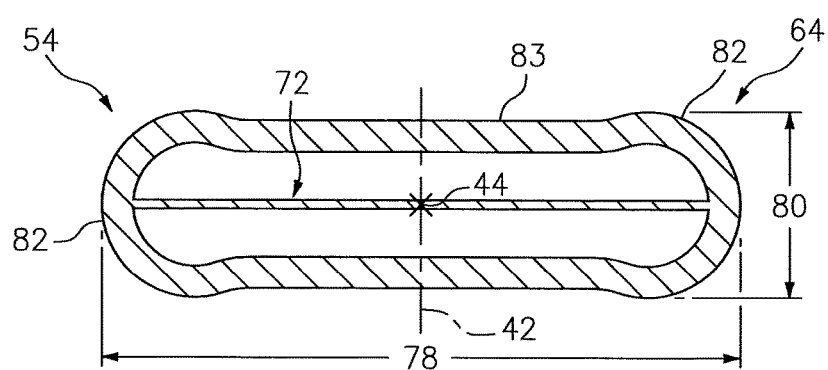
Figure 15:
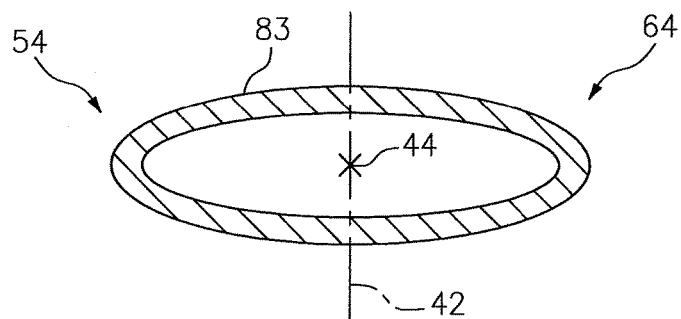
Figure 16:
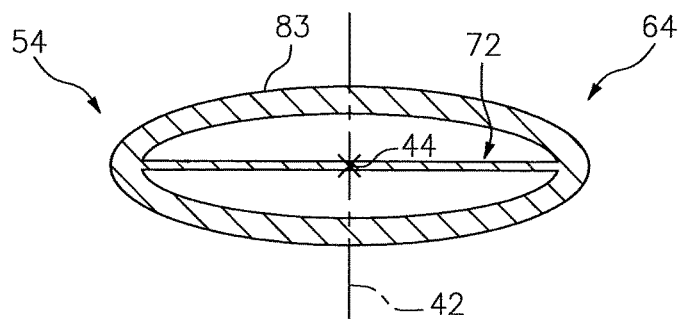

The first hinge portion 64 extends along the centerline 44 from the base portion 60 to the first transition portion 68. The first hinge portion 64 may have a (e.g., annular) cross-sectional geometry with a laterally elongated shape, several possible examples of which are shown in FIGS. 13-16. The first hinge portion 64, for example, may have an aspect ratio between its lateral width 78 and its vertical height 80 greater than one (e.g., width/height>1); e.g., see FIG. 14. An exemplary elongated shape is a race-track shape with (or without) bulbous ends 82 as shown in FIGS. 13 and 14. Another exemplary elongated shape is an elliptical (or oval) shape as shown in FIGS. 15 and 16. In such embodiments, more than about ninety percent (90%) of an outer surface 83 of the first hinge portion 64 may be generally flat or convex. The first hinge portion 64 of the present disclosure, however, is not limited to the foregoing exemplary cross-sectional shapes.

Referring to FIGS. 14 and 16, the first hinge portion 64 may also include an inner web (e.g., a portion of the web 72) that extends radially along the centerline 44 at least partially therein. This inner web 72 may provide additional strength and rigidity to the first hinge portion 64. The inner web 72 may also be provided to tailor hinge stiffness.

Referring to FIGS. 7 and 8, the second hinge portion 66 may be configured as the virtual lead-lag hinge 48 and/or the virtual torsion hinge 50. The second hinge portion 66, for example, may be configured to resiliently bend in a manner that enables movement of the attachment portion 62 and, thus, a respective rotor blade 38 (e.g., back and forth) along a trajectory 84 generally circumferential in the plane of rotor rotation (see FIG. 3). The second hinge portion 66 may also or alternatively be configured to resiliently twist in a manner that enables movement of the attachment portion 62 and, thus, a respective rotor blade along a trajectory 86 about the axis 44 of that rotor blade 38 (see FIG. 4).

Figure 17:
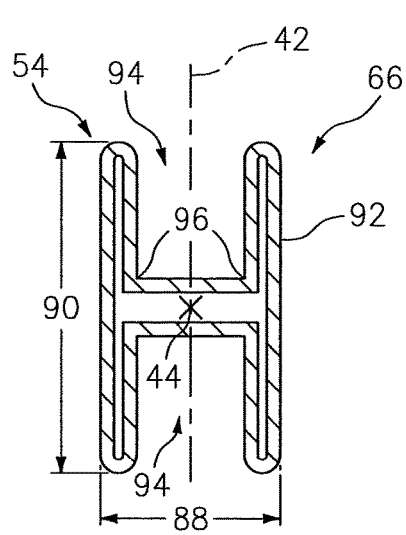
FIGS. 17-20 are cross-sectional illustrations of embodiments of a virtual lead-lag/torsion hinge portion of a rotor blade attachment structure.
Figure 18:
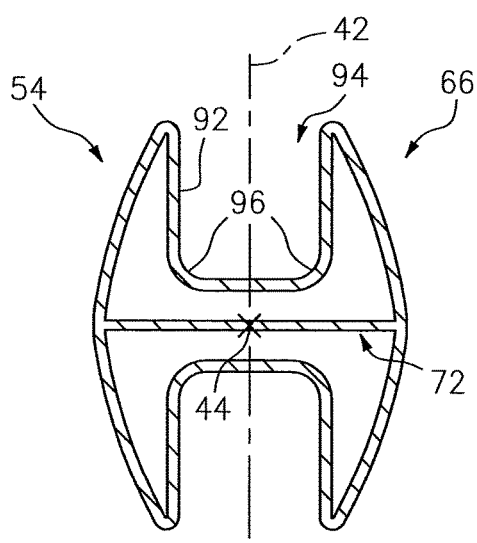
Figure 19:
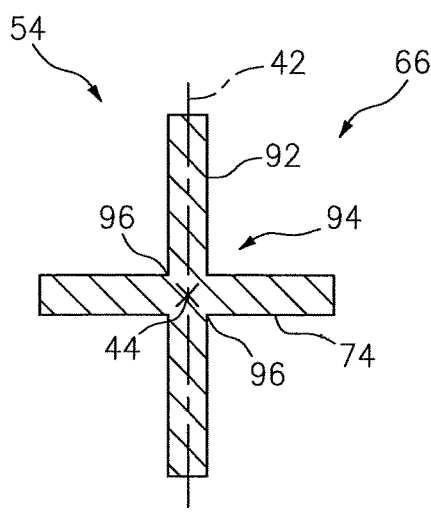
Figure 20:
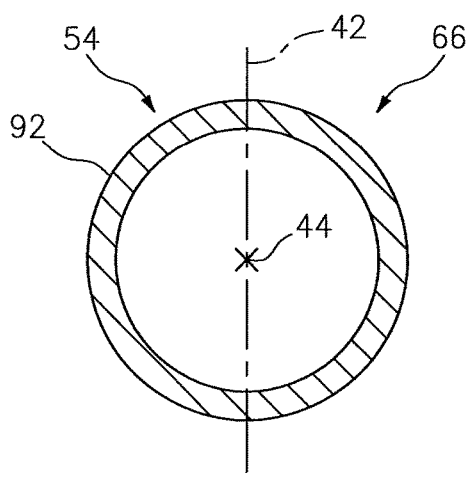

The second hinge portion 66 extends along the centerline 44 from the first transition portion 68 to the second transition portion 70. The second hinge portion 66 may have a (e.g., annular) cross-sectional geometry with a vertically elongated shape, several possible examples of which are shown in FIGS. 17-19. The second hinge portion 66, for example, may have an aspect ratio between its lateral width 88 and its vertical height 90 less than one (e.g., width/height<1); e.g., see FIG. 17. An exemplary elongated shape is a generally H-shape or I-beam shape as shown in FIGS. 17 and 18. Another exemplary elongated shape is a generally cruciform shape as shown in FIG. 19. In such embodiments, an outer surface 92 of the second hinge portion 66 may include one or more concave regions 94 and/or one or more inside corner regions 96. The second hinge portion 66 of the present disclosure, however, is not limited to the foregoing exemplary cross-sectional shapes. For example, referring to FIG. 20, the cross-sectional geometry of the second hinge portion 66 may have a circular shape and an aspect ratio equal to one (e.g., width/height=1). In such an embodiment, the hinging function may be provided by selectively orientating fibers within the attachment structure 54 material, where such fiber orientation techniques are generally known in the art of composites and, thus, not discussed in further detail.

Referring to FIG. 18, the second, hinge portion 66 may also include an inner web (e.g., a portion of the web 72) that extends radially along the centerline 44 at least partially therein. This inner web 72 may provide additional strength and rigidity to the first hinge portion 64. The inner web 72 may also be provided to tailor hinge stiffness. The outer (e.g., cruciform) portion of the second hinge portion 66 may also include a portion of the inner web 72, as shown in FIG. 19.

Referring to FIGS. 7 and 8, the first transition portion 68 is configured as a transition and linkage between the first hinge portion 64 and the second hinge portion 66. The first transition portion 68 extends radially along the centerline 44 from the first hinge portion 64 to the second hinge portion 66.

The second transition portion 70 is configured as a transition and linkage between the second hinge portion 66 and the attachment portion 62. The second transition portion 70 extends radially along the centerline 44 from the second hinge portion 66 to the attachment portion 62.

While the second hinge portion 66 is described above as providing both virtual lead-lag and torsion hinges 48 and 50, the attachment structures 54 of the present disclosure are not limited to such a configuration. For example, in other embodiments, one or more of the attachment structures 54 may each be configured with separate regions for the lead-lag and torsion hinges 48 and 50. In still other embodiments, one or more of the hinges 46, 48 and 50 may be omitted from one or more of the attachment structures 54. These omitted hinge(s) may alternatively be incorporated into other portions of the rotor head.

In some embodiments, resin may be included within one or more of the attachment structures 54; e.g., within the portion 66. This resin may be tailored to provide tuned constrained layer dampers. The resin, for example, may be a urethane matrix such as OPTI-G as described above.

The rotor head 40 of FIGS. 5 and 6 may be manufactured using various processes. For example, the rotor head 40 may be infusion molded using a clamshell mold with a collapsible inner mold. The rotor head 40, of course, may also or alternatively be manufactured using molding and/or other types of processes other than those described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An apparatus for a vertical take-off and landing aircraft, the apparatus comprising a rotor head including a rotor hub and a plurality of rotor blade attachment structures disposed about and extending radially out from the rotor hub, wherein each of the attachment structures comprises flexible matrix composite material, wherein a first of the attachment structures is configured with a virtual flapping hinge, a virtual lead-lag hinge and a virtual torsion hinge, wherein the rotor head comprises a monolithic bearingless rotor head, wherein at least a first portion the first of the attachment structures is hollow such that an internal bore extends radially within the first portion, wherein the first of the attachment structures has a longitudinal axis that extends radially out from the rotor hub, and wherein the first portion has an annular cross-sectional geometry when viewed in a plane perpendicular to the longitudinal axis.

2. The apparatus of claim 1, wherein the flexible matrix composite material is fiber reinforced.

3. The apparatus of claim 1, wherein the flexible matrix composite material is operable to damp flap, lead-lag and/or torsional rotor blade movement.

4. The apparatus of claim 1, wherein at least a portion of one of the attachment structures has a laterally elongated cross-sectional geometry.

5. The apparatus of claim 1, wherein at least a portion of one of the attachment structures has an axially elongated cross-sectional geometry.

6. The apparatus of claim 1, wherein an outer surface of at least a portion of one of the attachment structures has a concave region and/or an inside corner region.

7. The apparatus of claim 1, wherein at least a portion of one of the attachment structures includes a web.

8. The apparatus of claim 7, wherein the web extends substantially a radial length of the respective one of the attachment structures.

9. The apparatus of claim 1, wherein the rotor head is configured without any discrete dampers attached thereto.

10. The apparatus of claim 1, wherein the rotor head is configured with integral damping through the flexible matrix composite material.

11. The apparatus of claim 1, wherein the at least a first portion of the first of the attachment structures comprises the flexible matrix composite material.

12. An apparatus for a vertical take-off and landing aircraft, the apparatus comprising a monolithic bearingless rotor head including a rotor hub and a plurality of rotor blade attachment structures disposed around the rotor hub, wherein a first of the attachment structures has a longitudinal centerline and projects radially out from the rotor hub along the longitudinal centerline, wherein at least a first portion of the first of the attachment structures is hollow with an internal bore that extends along the longitudinal centerline within the first portion, and a tubular sidewall of the first portion extends circumferentially around the longitudinal centerline and the internal bore.

13. The apparatus of claim 12, wherein the rotor head comprises fiber reinforced, flexible matrix composite material.

14. The apparatus of claim 12, wherein one of the attachment structures comprises material operable to damp flap, lead-lag and/or torsional rotor blade movement.

15. The apparatus of claim 12, wherein one of the attachment structures is configured with a virtual flapping hinge, a virtual lead-lag hinge and/or a virtual torsion hinge.

* * * * *